(12) United States Patent
Wu

(10) Patent No.: US 9,737,985 B2
(45) Date of Patent: Aug. 22, 2017

(54) PARALLEL LINK ROBOT CONNECTED BY BALL JOINTS

(71) Applicant: FANUC CORPORATION, Minamitsuru-gun, Yamanashi (JP)

(72) Inventor: Yunfeng Wu, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 265 days.

(21) Appl. No.: 14/015,842

(22) Filed: Aug. 30, 2013

(65) Prior Publication Data

US 2014/0083232 A1   Mar. 27, 2014

Related U.S. Application Data

(60) Provisional application No. 61/697,909, filed on Sep. 7, 2012.

(30) Foreign Application Priority Data

Aug. 31, 2012  (JP) .................................. 2012-191543

(51) Int. Cl.
  *B25J 9/00*   (2006.01)
  *F16H 21/46*  (2006.01)
  *B25J 17/02*  (2006.01)

(52) U.S. Cl.
  CPC ............. *B25J 9/003* (2013.01); *B25J 9/0051* (2013.01); *B25J 17/0266* (2013.01); *F16H 21/46* (2013.01); *Y10T 74/20329* (2015.01)

(58) Field of Classification Search
  CPC ........................... B25J 17/0266; B23Q 1/5462

USPC ......................................... 74/490.07, 490.05
See application file for complete search history.

(56) References Cited

U.S. PATENT DOCUMENTS

| 3,245,706 | A   | * | 4/1966 | Rowlett  | F16C 11/0604 |
|           |     |   |        |          | 403/135      |
| 3,250,556 | A   | * | 5/1966 | Couch    | F16C 11/0633 |
|           |     |   |        |          | 384/203      |
| 6,419,211 | B1  | * | 7/2002 | Hvittfeldt | B25J 17/0275 |
|           |     |   |        |          | 267/136      |
| 7,914,313 | B1  | * | 3/2011 | Ramsey   | G01R 1/0466  |
|           |     |   |        |          | 439/330      |

(Continued)

FOREIGN PATENT DOCUMENTS

| CN | 101541483 A | 9/2009 |
| CN | 101554727 A | 10/2009 |

(Continued)

OTHER PUBLICATIONS

Office Action dated Apr. 17, 2015, coresponding to Chinese patent application No. 201310383126.7.

(Continued)

*Primary Examiner* — William Kelleher
*Assistant Examiner* — Randell J Krug
(74) *Attorney, Agent, or Firm* — Hauptman Ham, LLP

(57) ABSTRACT

A parallel link robot (10) including ball joints (42a to 42d) which are arranged between driven links (22a, 23a) and a drive link (21a) and between a driven link and a movable part (12), at least one of these ball joints including a ball (44a) and a housing (42a) which covers at least half of the surface of the ball including the maximum diameter part and further including with a covering part (45a) which covers the area around the ball of the ball joint.

6 Claims, 4 Drawing Sheets

(56) References Cited

U.S. PATENT DOCUMENTS

| | | | | |
|---|---|---|---|---|
| 8,047,093 B2* | 11/2011 | Kinoshita | | B25J 17/0266 74/490.03 |
| 8,056,955 B1* | 11/2011 | Schmeichel | | B60J 7/085 296/100.14 |
| 8,109,173 B2* | 2/2012 | Kinoshita | | B25J 17/0266 74/490.06 |
| 8,113,083 B2* | 2/2012 | Breu | | B25J 17/0266 74/490.01 |
| 8,307,732 B2* | 11/2012 | Kinoshita | | B25J 17/0266 74/490.01 |
| 8,418,579 B2* | 4/2013 | Zhang | | B25J 17/0266 74/490.01 |
| 8,684,621 B2* | 4/2014 | Forthaus | | F16C 7/02 403/134 |
| 8,714,903 B2* | 5/2014 | Feng | | B25J 9/0051 414/729 |
| 8,973,459 B2* | 3/2015 | Fukudome | | B25J 17/0266 74/490.01 |
| 9,157,484 B2* | 10/2015 | Hirano | | F16C 3/035 |
| 2003/0078120 A1* | 4/2003 | Konno | | F16H 7/18 474/111 |
| 2005/0020394 A1* | 1/2005 | Valle | | B62M 9/00 474/155 |
| 2005/0193598 A1* | 9/2005 | Buhse | | E02F 3/60 37/398 |
| 2006/0171775 A1* | 8/2006 | McLaughlin | | F16C 11/0614 403/122 |
| 2006/0182602 A1* | 8/2006 | Schuler | | B23Q 1/5456 414/735 |
| 2008/0105498 A1* | 5/2008 | Perkins | | B66F 11/042 187/269 |
| 2009/0211390 A1* | 8/2009 | Brogardh | | B25J 17/0266 74/490.03 |
| 2009/0255363 A1* | 10/2009 | Nishida | | B25J 13/087 74/490.07 |
| 2010/0005919 A1* | 1/2010 | Breu | | B25J 17/0266 74/490.05 |
| 2010/0037721 A1* | 2/2010 | Nakao | | B25J 17/0266 74/490.05 |
| 2011/0097184 A1* | 4/2011 | Kinoshita | | B25J 17/0266 414/589 |
| 2011/0100180 A1* | 5/2011 | Mulders | | A21C 5/00 83/401 |
| 2011/0120254 A1* | 5/2011 | Zhang | | B25J 17/0266 74/490.04 |
| 2011/0259138 A1* | 10/2011 | Hombach | | B25J 17/0266 74/490.05 |
| 2011/0277581 A1 | 11/2011 | Bunsendal et al. | | |
| 2011/0291433 A1* | 12/2011 | Feng | | B25J 17/0266 294/65 |
| 2012/0076570 A1 | 3/2012 | Mekid | | |
| 2012/0170969 A1* | 7/2012 | Forthaus | | F16C 7/02 403/50 |
| 2012/0282014 A1* | 11/2012 | Ersoy | | F16C 11/0647 403/122 |
| 2012/0319366 A1* | 12/2012 | Yagiela | | B60G 9/003 280/6.157 |
| 2013/0001913 A1* | 1/2013 | Aalderink | | B60G 7/02 280/124.153 |
| 2013/0056952 A1* | 3/2013 | Barkley | | B62J 1/02 280/283 |
| 2013/0205932 A1* | 8/2013 | Fukudome | | B25J 17/0266 74/490.01 |
| 2013/0219720 A1* | 8/2013 | Jekel | | B60G 7/005 29/897.2 |
| 2014/0096636 A1* | 4/2014 | Hirano | | F16C 3/035 74/490.01 |

FOREIGN PATENT DOCUMENTS

| | | | | |
|---|---|---|---|---|
| CN | 102601797 A | 7/2012 | | |
| CN | 102615642 A | 8/2012 | | |
| DE | 102008019966 A1 * | 10/2009 | | B25J 17/0266 |
| FR | EP 2551222 A1 * | 1/2013 | | B65G 47/90 |
| JP | 2564416 * | 3/1998 | | |
| JP | 2564416 Y2 * | 3/1998 | | |
| JP | 2002-529258 A | 9/2002 | | |
| JP | 2009248287 A | 10/2009 | | |
| JP | 2009-255200 A | 11/2009 | | |

OTHER PUBLICATIONS

Office Action mailed May 20, 2014, corresponds to Japanese patent application No. 2012-191543.

Office Action dated Feb. 6, 2015, corresponding to German patent application No. 102013014272.5.

* cited by examiner

PARALLEL LINK ROBOT CONNECTED BY BALL JOINTS

RELATED APPLICATIONS

The present application is based on, and claims priority from, Japanese Application Number 2012-191543, filed Aug. 31, 2012, and U.S. Provisional Application No. 61/697,909, filed Sep. 7, 2012 the disclosure of which is hereby incorporated by reference herein in its entirety.

BACKGROUND OF INVENTION

1. Field of the Invention

The present invention relates to a parallel link robot which uses a δ-type parallel link mechanism which is connected by ball joints and which positions an end effecter three-dimensionally.

2. Description of the Related Art

FIG. 6 is a perspective view of a parallel link robot in the related art. As shown in FIG. 6, the parallel link robot 100 of the related art mainly contains a base part 110, a movable part 120, and three link parts 200a to 200c which link the base part 110 and movable part 120. Note that, the movable part 120 is provided with a mounting member 190 of a not shown end effecter.

As can be seen from FIG. 6, the link part 200a includes a drive link 210a which extends from the base part 110 and two driven links 220a and 230a which extend from the movable part 120. Further, the base part 110 includes an actuator 130a which drives the drive link 210a. Note that, the other link parts 200b and 200c are similarly configured. By individually controlling the actuators 130a to 130c of these link parts 200a to 200c, it is possible to make the movable part 120 move by three degrees of freedom (first axis to third axis) and position it at a desired position.

In this regard, the drive link 210a and driven links 220a and 230a and the driven links 220a and 230a and movable part 120 are joined by ball joints which are comprised of balls and cups. In International Publication of Translated Version No. 2002-529258A, to increase the range of possible movement of the ball joints, the cups are made smaller than half spheres. In this case, the cups can be separated from the balls. Therefore, to avoid the cups from being separated from the balls, two facing cups have to be connected by springs.

However, even when providing such springs, if outside forces which are larger than the forces of the springs are applied, the balls of the ball joints may be detached from the cups. In particular, when a parallel link robot is used in the field of food, pharmaceuticals, cosmetics, etc., due to problems in sanitation, it is necessary to avoid separation of the ball joints. Further, for similar reasons, it is desirable to prevent wear debris which is produced from the ball joints from being dispersed.

Further, in general, a parallel link robot is required to operate at a high speed. To realize this, it is necessary to make the driven links and movable part as light as possible.

The present invention was made in consideration of such a situation and has as its object to provide a parallel link robot which is provided with difficult-to-separate ball joints and which is light weight and prevents wear debris from being dispersed.

SUMMARY OF INVENTION

To achieve the above-mentioned object, according to a first aspect, there is provided with a parallel link robot comprising a base part, a movable part, three link parts which link the base part and the movable part and respectively have single degrees of freedom with respect to the base part, and three actuators which drive the respective link parts, wherein each link part is comprised of a drive link which is linked with the base part and two driven links which link the drive link and the movable part and are parallel with each other, wherein the parallel link robot comprises ball joints which are arranged between the driven links and the drive link and between the driven links and the movable part, at least one of these ball joints including a ball and a housing which covers at least half of the surface of the ball including the maximum diameter part, and, wherein the parallel link robot comprises a covering part which seals and covers the area around the ball of the ball joint.

According to a second aspect, there is provided the first aspect further comprising elongated plates which link the two driven links of the link part.

These objects, features, and advantages of the present invention and other objects, features, and advantages will become further clearer from the detailed description of typical embodiments of the present invention which are shown in the attached drawings.

DETAILED DESCRIPTION

Below, the attached figures will be referred to so as to explain the embodiments of the present invention. In the following figures, similar members are assigned similar reference signs. To facilitate understanding, these figures are suitably changed in scale.

Figure 1:
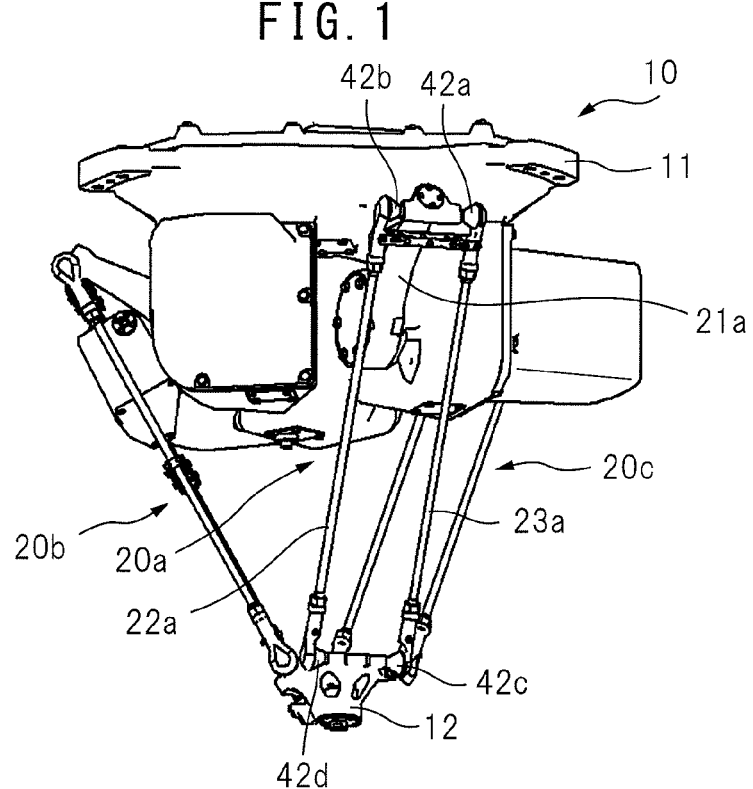
FIG. 1 is a perspective view of a parallel link robot according to the present invention.

FIG. 1 is a perspective view of a parallel link robot according to the present invention. In FIG. 1, the parallel link robot 10 mainly includes a base part 11, a movable part 12, and three link parts 20a to 20c which link the base part 11 and movable part 12. At the bottom surface of the movable part 12, a not shown end effecter is attached.

As shown in FIG. 1, the link part 20a is comprised of a drive link 21a and two driven links 22a and 23a which extend from the movable part 12 in parallel with each other. These drive link 21a and driven links 22a and 23a are linked with each other by the ball joints 42a and 42b. Further, the front ends of the driven links 22a and 23a are linked by other ball joints 42c and 42d to the movable part 12. Further, while not shown in the figure, the drive link 21a which extends from the base part 11 is connected to an actuator (not shown) which drives the drive link 21a. This actuator is placed on the base part 11.

The other link parts 20b and 20c are configured in the same way as the link part 20a, so a detailed explanation thereof will be omitted. As can be seen from the figure, the parallel link robot 10 of the present invention is a δ-type. Further, by individually controlling the actuators 13a to 13c of the link parts 20a to 20c, the mounting member (not shown) which is linked with the movable part 12 can be positioned at a desired position by three degrees of freedom with respect to the first axis to the third axis.

Figure 2:
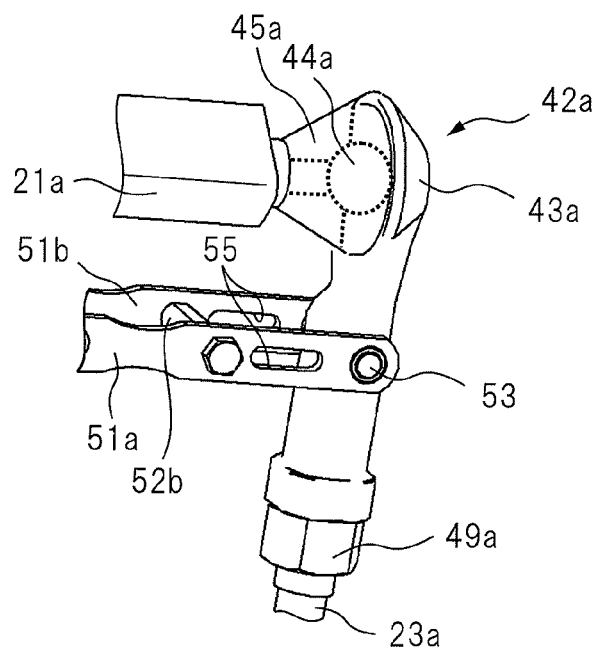
FIG. 2 is an enlarged view of a link part between the drive link and the driven links.
Figure 3:
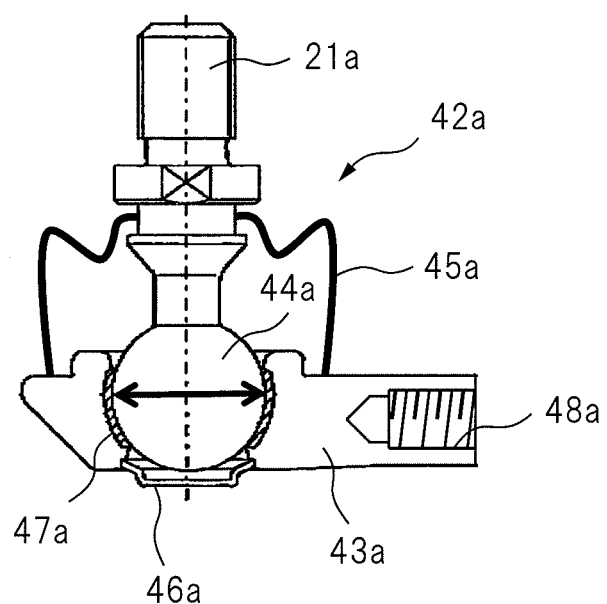
FIG. 3 is a cross-sectional view of a ball joint.

FIG. 2 is an enlarged view of a link part of the drive link and driven links, while FIG. 3 is a cross-sectional view of a ball joint. Below, referring to these figures, a ball joint 42a will be explained. Note that, the other ball joints 42b etc. are similar, so explanations of them will be omitted.

As can be seen from FIG. 2 and FIG. 3, the ball joint 42a includes a housing 43a and a ball 44a which is held in the housing 43a. In FIG. 3, a liner 47a which is comprised of resin or Teflon® etc. is arranged between the ball 44a and the housing 43a. Furthermore, the interface between the ball 44a and the housing 43a is coated with a lubricant. Due to these liner 47a and lubricant, the ball 44a rotates smoothly with respect to the housing 43a.

As can be seen in particular from FIG. 3, the housing 43a is formed so as to cover at least half of the surface of the ball 44a including the maximum diameter part (e.g., a great circle of the ball 44a). In other words, the ball 44a is snapped into the housing 43a. For this reason, in the present invention, even when outside force is applied or even when a severe load is applied to a joint part in a high speed operation, the ball 44a cannot be easily separated from the housing 43a.

Therefore, in the present invention, there is no need to connect the two driven links 22a and 23a together by a spring etc. For this reason, in the present invention, the parallel link robot 10 can be lightened by exactly the amount of the spring. It will be understood that due to this as well, the movable part 12 can be made to move at a higher speed.

Further, as shown in FIG. 2 and FIG. 3, a covering part 45a is provided which seals and covers the part of the ball 44a which is exposed from the housing 43a. The covering part 45a is preferably formed from an elastic material, for example, rubber or silicone, for flexibly tracking the movement of the ball joint 42a.

Further, the covering part 45a which is shown in FIG. 2 is a substantially conical shape. On the contrary, the covering part 45a which is shown in FIG. 3 is attached loosely in a serpentine shape. It will be understood that such a shape improves the trackability and flexibility of the covering part 45a.

Furthermore, as can be seen from FIG. 3, part of the ball 44a which is positioned at the opposite side as the drive link 21a is exposed from the housing 43a. In the present invention, the exposed part of this ball 44a is closed by a lid part 46a. The lid part 46a may be formed from a material similar to the covering part 45a or may be formed from a hard material.

In this way, in the present invention, the engaged part between the ball 44a and the housing 43a is covered by the covering 45a or both the covering part 45a and the lid part 46a. Therefore, the wear debris which is generated from the ball joint 42a is never dispersed from the space which is formed by the covering part 45a and the lid part 46a. Therefore, the parallel link robot 10 of the present invention is particularly advantageous when used in the fields of food, pharmaceuticals, cosmetics, etc.

In this regard, as can be seen from FIG. 1, ball joints 42a, 42c are arranged at both ends of the driven link 23a, the center distance between the ball joints 42a and 42c has to be made to accurately match with a desired value in order to reduce the distortion of the robot coordinates. In FIG. 3, the housing 43a contains an extended part which locally extends. The extended part is formed with a thread part 48a.

Figure 4:
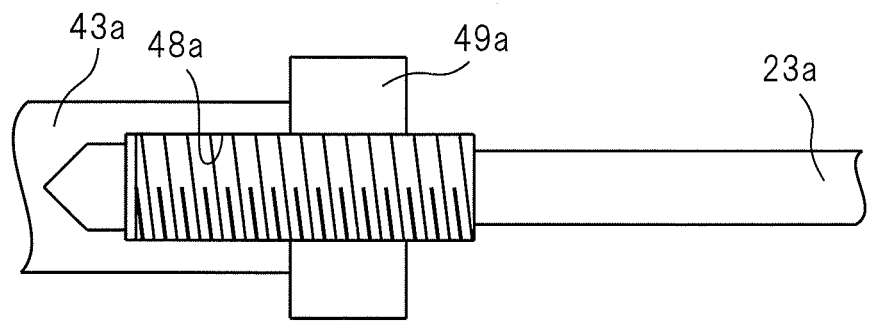
FIG. 4 is a partial cross-sectional view of the housing of the ball joint.

Further, in the partial cross-sectional view of the housing of the ball joint of FIG. 4, the thread part 48a of the housing 43a is engaged with a thread part which is formed at one end of a driven link 23a. Note that, the other end of the driven link 23a is also formed with a similar thread part. The thread parts of the driven link 23a is formed longer than the threaded part 48a of the housing 43a in the axial direction of the driven link 23a. The driven link 23a may for example be prepared by attaching screw members to the two ends of a carbon, light weight pipe. Further, the driven link 23a may also be prepared from aluminum or resin.

In the present invention, the center distance between the two ball joints 42a and 42c is adjusted by the amount of screw-in of the two ends of the driven link 23a. If screwing in the driven links 23b until the desired distance is obtained, as shown in FIG. 2 and FIG. 4, the nuts 49a are screwed over the remaining thread parts of the driven link 23a and are fastened near to the housing 43a. Due to this, the driven links 23a can be fastened to the housing 43a and the center distance between the two ball joints 42a and 42c can be fastened. Therefore, the parallel link robot 10 can be accurately operated.

Figure 5:
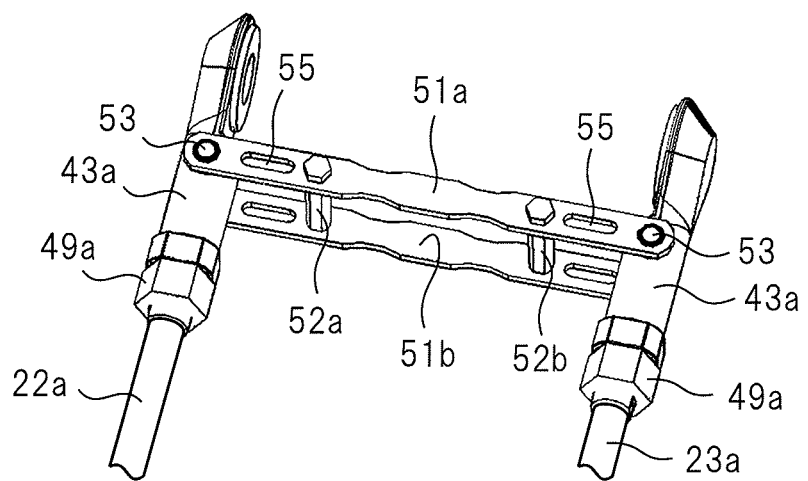
FIG. 5 is a partial perspective view of a pair of driven links.
Figure 6:
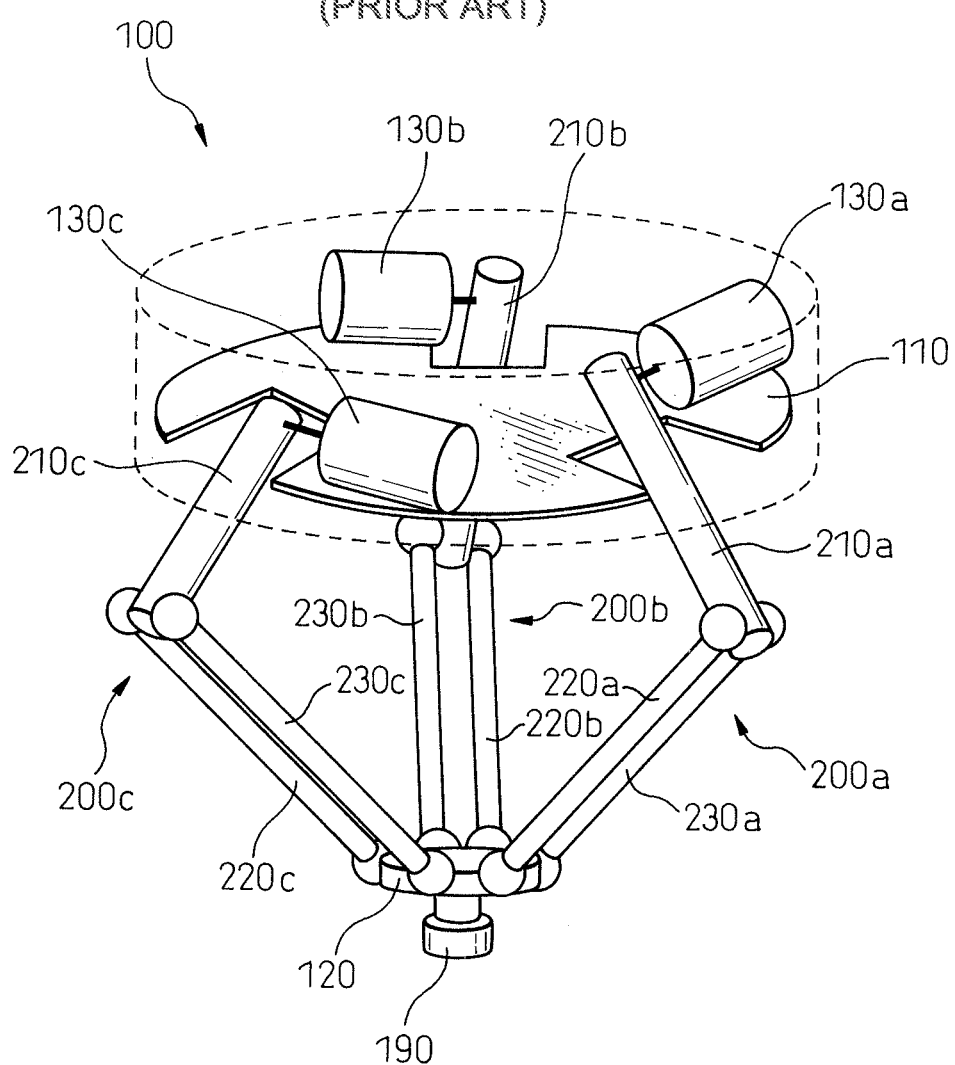
FIG. 6 is a perspective view of a parallel link robot in the prior art.

FIG. 5 is a partial perspective view of a pair of driven links. As shown in FIG. 2 and FIG. 5, spacers 52 a and 52 b which are fastened by bolts are used to join the two elongated plates 51 a and 51 b. Due to this, the two elongated plates 51 a and 51 b are arranged in parallel with each other. Further, the two elongated plates 51 a and 51 b are arranged between the pair of driven links 22 a and 23 a.

Furthermore, these two elongated plates 51a and 51b are linked with the driven links 22a and 23a which can pivot around the rotary shafts 53. To enable the elongated plates 51a and 51b to be made to smoothly pivot with respect to the driven links 22a and 23a, the rotary shafts 53 may have slide bearings or ball bearings arranged at them.

As can be seen from FIG. 5, the two elongated plates 51a and 51b are linked with the two drive links 22a and 23a near the linking part between the drive link 21a and two driven links 22a and 23a separated as much as possible from the movable part. The reason is to reduce the weight of the movable part 12 side which is actually made to move.

These elongated plates 51 a and 51 b perform the functions of keeping the two driven links 22 a and 23 a from rotating about their axes along the longitudinal direction of the rod and simultaneously maintaining the distance of the driven links 22 a and 23 a constant. Therefore, the elongated plates 51 a and 51 b can be used to further prevent the ball joints 42 a from separating into the housings 43 a and balls 44 a.

Furthermore, as shown in FIG. 5, the two elongated plates 51a and 51b are formed with pluralities of elongated openings 55 which extend in the axial direction. Due to these elongated openings 55, the elongated plates 51a and 51b can be further lightened. As a result, it will be understood that the movable part 12 can be made to move at a higher speed.

Advantageous Effects of Invention

In the first aspect, at least half of the surface of the ball including the maximum diameter part is covered by the housing. Further, a covering part is provided which seals and covers the area around the ball. For this reason, even if wear debris between the ball and the housing is generated, dispersion to the outside can be prevented. Furthermore, since at least half of the surface of the ball including the maximum diameter part is covered by the housing, even when outside force is applied, separation of the ball joint can be prevented. Furthermore, there is no need to use springs, so the parallel link robot can be lightened.

In the second aspect, elongated plates are used to keep the two driven links from rotating about their rotary shafts. Therefore, separation of the ball joints can be further prevented.

Typical embodiments were used to explain the present invention, but it will be understood that a person skilled in the art could make the above-mentioned changes and various other changes, deletions, and additions without departing from the scope of the present invention.

The invention claimed is:

1. A parallel link robot, comprising:
a base part;
a movable part;
three link parts which link said base part and said movable part and respectively have single degrees of freedom with respect to said base part; and
three actuators configured to drive the respective link parts,
wherein each of said link parts comprises
a drive link which is linked with said base part, and
two driven links which link said drive link and said movable part and are parallel with each other,
wherein the parallel link robot further comprises ball joints which are arranged
between said driven links and said drive link, and
between said driven links and said movable part,
wherein each of said ball joints includes a ball and a one-piece housing which covers a maximum diameter part of said ball, a first part of a surface of the ball at one side of the maximum diameter part and a second part of the surface of the ball at another side of the maximum diameter part,
wherein the parallel link robot further comprises
a covering part which seals and covers the area around said ball of said ball joint;
two elongated plates which link said two driven links of said link part;
rotary shafts by which the two elongated plates are linked with said two driven links of said link part; and
two spacers which are arranged between the two elongated plates, and are spaced from each other and from the rotary shafts along a longitudinal direction of the two elongated plates, and
wherein
the two elongated plates are arranged in parallel with each other by the two spacers between the two elongated plates,
the two elongated plates are pivotable, with respect to the driven links, around the rotary shafts,
the two elongated plates are positioned closer to a linking part between the drive link and the two driven links than the moveable part,
each of the two elongated plates further comprises an opening elongated in the longitudinal direction of the elongated plate,
the elongated plates are configured to maintain a distance between the driven links constant,
the housing of each of said ball joints has an extended part extending away from the ball of said ball joint, the extended part has a threaded part engaged with a corresponding threaded part at an end of the corresponding driven link, and the threaded parts are configured to adjust a center distance between the two ball joints coupled to said driven link, and
the driven links are not connected to each other between the elongated plates and the moveable part.

2. The parallel link robot as set forth in claim 1, wherein the covering part has a conical shape tapering toward the drive link.

3. The parallel link robot as set forth in claim 1, wherein the covering part has a serpentine shape for improving trackability and flexibility of the covering part.

4. The parallel link robot as set forth in claim 1, wherein each of the elongated plates has two elongated openings elongated in the longitudinal direction of the elongated plate, and
the spacers are arranged, in the longitudinal direction of the elongated plate, between the two elongated openings.

5. The parallel link robot as set forth in claim 4, wherein the covering part has a conical shape tapering toward the drive link.

6. The parallel link robot as set forth in claim 4, wherein the covering part has a serpentine shape for improving trackability and flexibility of the covering part.

* * * * *